May 26, 1942. C. J. STUART 2,284,308
STOP AND SYNCHRONIZED DRIVE MECHANISM
Filed Nov. 9, 1940 2 Sheets-Sheet 1
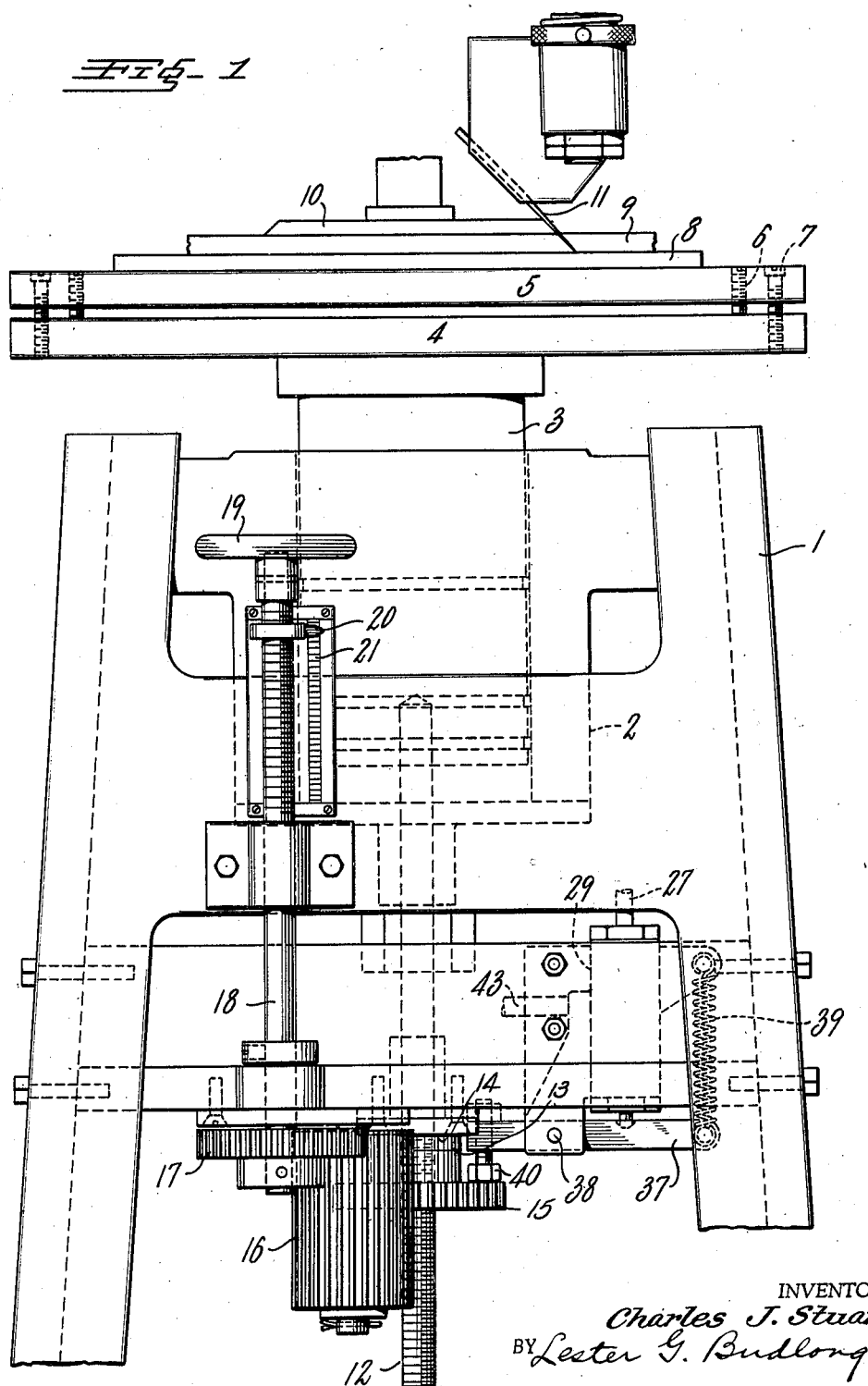
INVENTOR.
Charles J. Stuart
BY Lester G. Budlong
ATTORNEY

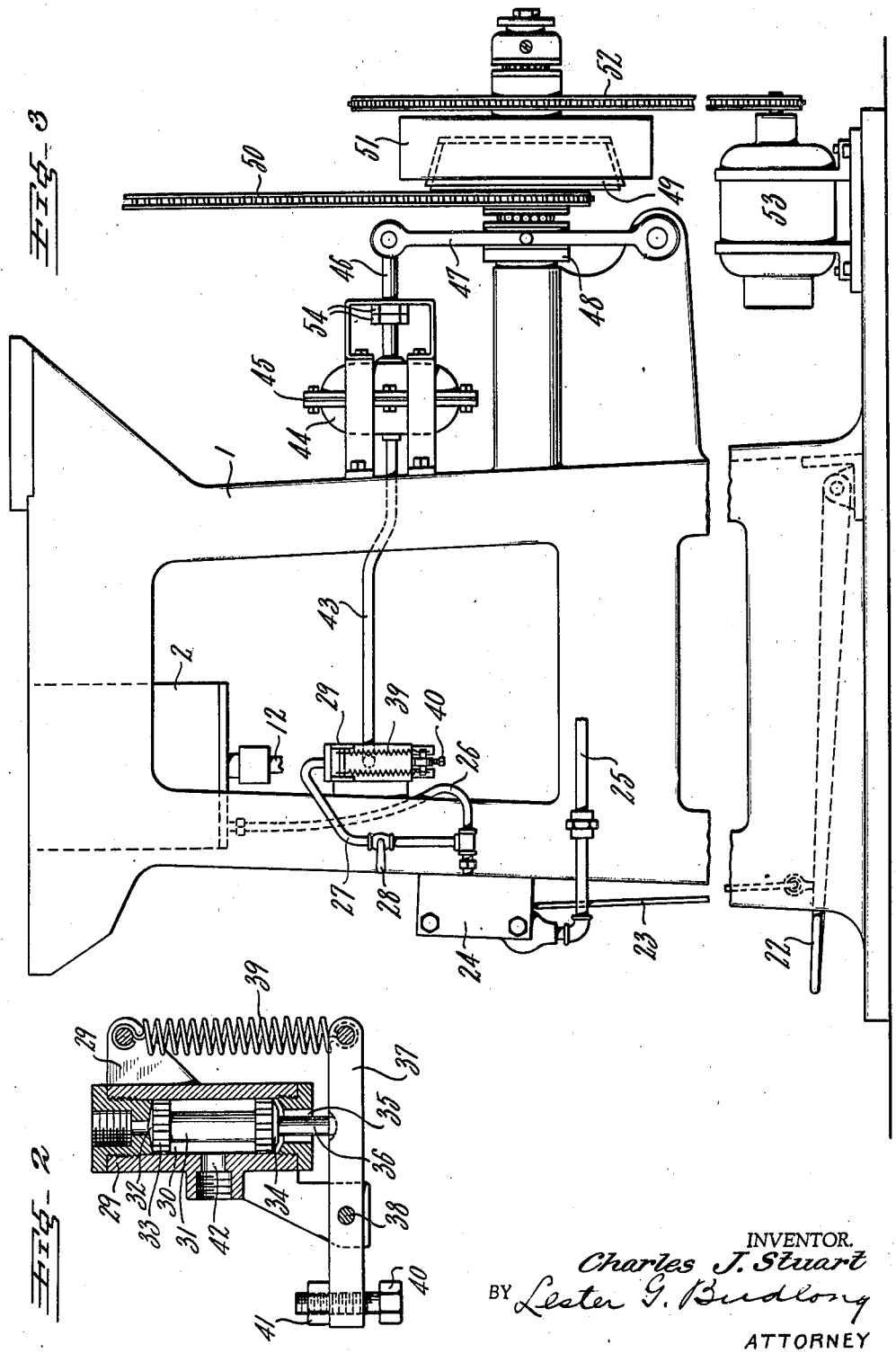

Patented May 26, 1942

2,284,308

UNITED STATES PATENT OFFICE 2,284,308

STOP AND SYNCHRONIZED DRIVE MECHANISM

Charles J. Stuart, Medford, Mass., assignor to Wellman Company, Medford, Mass., a corporation of Maine Application November 9, 1940, Serial No. 364,963

5 Claims. (Cl. 12—25)

This invention relates to a stop and synchronized drive mechanism, more particularly as applied to blank cutting machines.

In the mechanical arts a large number of machines have been developed for cutting blanks of different types, and in the rubber footwear art there has been an extensive use of sole cutting machines of the type disclosed in the patent to McGowan No. 1,645,441. In machines of the McGowan type the stock is clamped between an upper pattern and a lower work table which is moved upwardly to grip the stock, and while in this relation a knife is driven around the edge of the pattern to cut out the blank. In the McGowan machine the work table is raised by an air piston, and adjacent one corner of the work table there is a downwardly extending rod which carries an adjusting nut engageable with a fixed stop on the machine frame to limit the upward movement of the table. With every change in pattern or thickness of stock the operator must adjust the stop so as to clamp the work with just exactly the right degree of pressure, and the work table must bear evenly at all points against the pattern for proper cutting of the blanks. By reason of the central application of pressure from the air piston while the stop is located at one side of the center, difficulty has been encountered in maintaining the level of the table so as to evenly clamp the work, particularly after wear of the parts. Also for each adjustment of the work table it is necessary to adjust the timing of the cutting mechanism in order that it may start in desired synchronism with the clamping of the stock. If the cutting mechanism is started before the stock is properly clamped, the blanks will be irregular and ruined for practical purposes. On the other hand, if the timing mechanism disclosed in the McGowan patent operates too late it may have the effect of preventing the clutch on the drive mechanism from completely closing, thereby causing slippage and slowing down the speed of cutting. Previously, therefore, the adjustment of the timing of the cutting mechanism with respect to the raising of the work table has been a hit or miss operation dependent solely on the experience and observation of the operator.

The present invention aims at a stop mechanism which can be quickly and readily adjusted and which can act without causing lateral strain on the work table, and this result is accomplished by placing the stop mechanism centrally or axially of the work table and operating it directly from the air piston used for raising the table. While this stop mechanism is capable of independent use it is in the present invention also employed for the purpose of synchronizing the starting of the cutting mechanism with the clamping of the stock, and this result is accomplished by an air valve which is adjustably actuated by the stop mechanism and which in turn controls the clutch of the drive mechanism for the cutter. The adjustment of the air valve is so related to the stop mechanism that errors of judgment on the part of the operator are obviated.

An object of the invention is to provide an improved stop mechanism for movable work tables which is easily adjusted, convenient to the operator while inspecting the operation of the table, and which will not in any way interfere with the proper levelling of the work table.

Another object is to provide a control mechanism for the actuating means of the cutting mechanism which can be adjusted by an unskilled operator, and which is synchronized with the stop mechanism so as to always start the cutting mechanism in desired properly timed relation with the movement of the work table.

Other objects will appear from the detailed description and drawings, in which latter Figure 1 is a broken-away front elevation of certain parts of a sole cutting machine, Figure 2 is a detail, partly in section, of an air valve for controlling the knife drive mechanism, and Figure 3 is a broken-away side view showing the connections between the air control valve and the knife drive mechanism of the machine.

Referring to the drawings, in Figure 1 there is shown a frame 1 in which is mounted a cylinder 2 provided with a piston 3 which carries at its upper end the lower element 4 of a platen or work table 5, which elements 4 and 5 are connected by means of levelling screws 6 and 7. Disposed on the work table is a backing sheet 8 upon which rests a sheet 9 of the stock to be cut, which sheet is clamped to the backing sheet and work table by the pattern 10, and at 11 is shown a knife which cuts out the blank while moving around the periphery of the pattern. All of these parts are substantially as disclosed in the McGowan Patent No. 1,645,441.

In place of the stop mechanism shown in Figure 2 of the McGowan patent the following mechanism is provided. Attached to the piston 3 is a tail rod 12 upon which is threadedly mounted a movable stop 13 which is adapted to engage a fixed stop 14 when the piston is raised and thus limit the upward movement of the work table. Secured to or integral with the movable stop 13 is a pinion 15 which engages and slides on a long pinion 16 mounted on the machine frame, which latter pinion in turn engages a pinion 17 carried by the shaft 18, operated by the hand wheel 19. A pointer 20 is threaded on and moved by the shaft 18 against an index 21.

Referring to Figures 2 and 3, there is shown a pedal 22 which through a link 23 operates an air valve in casing 24 to permit the passage of air from the main 25 through the pipe 26 to the cylinder 2, and upon release of the pedal 22 the valve in casing 24 also permits the exhaust of air from the cylinder, all of these parts being substantially as shown in said McGowan patent. Connected to the air pipe 26 is a pipe 27 governed by the valve 28, which pipe leads into the upper end of a valve casing 29 (Figure 2) provided with a chamber 30. In this chamber there is movable a double headed valve 31, the upper head 32 of which when seated shuts off ingress of air to the valve casing, and by reason of the grooves 33 in the side of the valve air can enter the chamber 30, when the valve is opened. The lower head 34 of the valve is also provided with grooves at its side and when seated shuts off exhaust of air through the port 35. Projecting from the valve 31 through the port 35 is a pin 36 having a bearing against a lever 37 pivoted at 38 on the valve casing, and springs 39 attached to one end of the lever urge the valve 31 normally upward to a position closing it against inlet of air and opening the exhaust port 35. At the other end of the lever from the pivot 38, and equally spaced therefrom with respect to the pin 36, is a contact screw 40 which is threadedly mounted in the end of the lever and adjustably held by the lock nut 41. It will be noted from Figure 1 that this contact screw 40 is in vertical alignment with the side of the pinion 15, and it is adapted to be engaged by the pinion 15, as will be later set forth.

At the side of the valve chamber 30 is a port 42 with which is connected a pipe 43 leading into one side of the casing 44 which is divided centrally by a flexible diaphragm 45. Attached to the diaphragm 45 on the opposite side is a rod 46 which is connected to a pivoted lever 47 which actuates the clutch ring 48. The clutch ring when moved by the lever 47 in one direction engages the shiftable clutch member 49 with its drive member 51, the shiftable clutch member 49 being connected by a sprocket and drive 50 with the cutting mechanism of the machine in the manner disclosed in the McGowan patent. The drive member 51 of the clutch is connected by the sprocket and chain mechanism 52 with a motor 53. Stop and lock nuts 54 are mounted on the rod 46 to limit the movement of the shiftable member 49 of the clutch mechanism.

In use the operator by turning the hand wheel 19 adjusts the movable stop 13 so that it will contact with the fixed stop 14 at the proper moment to permit the work table to clamp the stock against the pattern with the desired pressure, and as before pointed out this adjustment must be made for every change in pattern or thickness of stock. The hand wheel 19 is located on the front of the machine so that the operator can readily operate it while watching the clamping action of the work table, and by means of the pointer 20 and index 21 he may readily ascertain at what point to adjust the movable stop 13. This stop mechanism may be substituted on any of the present type McGowan machines or others having the previous stop mechanism at the corner of the work table. It will be seen that the adjustment can be readily and quickly made, it does not require the use of wrenches or lock nuts, and that by reason of its central location there is no tendency whatever to tilt the work table when the latter is raised by the piston, thereby causing uneven clamping of the work.

During the adjustment of the stop the valve 28 is turned to shut off the supply of air to the valve casing 29 so that the operator may raise and lower the work table without operating the cutting mechanism. After the work table has been properly adjusted the valve 28 is then turned to open it so that when the air is supplied to raise the piston it is at the same time supplied to the valve casing 29 for operating the cutting mechanism. It will be noted from an inspection of Figure 2 that the valve 31 is so constructed that a very small downward movement will completely open the valve for the admission of air to the chamber 30, and for convenience this movement may be about $\frac{1}{16}$", but any other suitable dimension may be used.

To properly synchronize the operation of the cutting mechanism with that of the work table elevating mechanism the operator may raise the work table while inserting a $\frac{1}{16}$" gauge, if this is the extent of movement of the air valve, between the movable stop 13 and the fixed stop 14. When the piston has raised the work table and thus clamped the gauge between the two stops, the contact screw 40 is then adjusted until it barely contacts the side of the pinion 15 and locked in such position by the nut 41. Since the horizontal distance from the pivot 38 is the same to the contact screw 40 and the pin 36 of the valve 31 it will be seen that in operation when the work table is raised the pinion 15 will contact the screw 40 one-sixteenth of an inch or other fixed distance before the movable stop engages the fixed stop, and during the remaining movement of the stop 13 it will raise the screw 40 while the opposite end of the lever 37 will be moved downwardly against the tension of the springs 39, thus permitting the valve 31 to fall by reason of gravity and the entering air under pressure and close the exhaust port 35. The air then passes through the pipe 43, actuates the diaphragm 45, and through the rod 46 and lever 47 closes the clutch and starts the knife mechanism operating.

When the operator desires to stop the machine he merely releases the pedal 22 and through the valve in casing 24, the air in the cylinder 2 and the air in the clutch operating diaphragm case 44 is exhausted thus stopping the knife and allowing the work table to drop. As soon as the work table begins to move downward, pinion 15 releases the pressure against contact screw 40 thereby permitting the springs 39 to draw up the end of lever 37 so re-setting the valve in casing 29 to its closed position.

While in the present embodiment the control of the operation of the clutch for the drive mechanism has been by means of compressed air, it is obvious that in place of the valve casing 29 and associated parts an ordinary electric contact switch might be substituted, and this might be used to actuate a magnetic clutch in place of the clutch shown. In fact, any equivalent electrical operating mechanism can be substituted in the various controls shown.

It will be seen that the present invention has accomplished a number of desirable improvements in the operation of machines using movable work tables and drive mechanism for actuating machinery operating on materials or articles clamped on the work table, and it is not limited in its application to sole cutting machines. When the work table has been once properly levelled with respect to the pattern there will be no difficulty by reason of an eccentrically disposed table stop causing tilting when the table is raised. The adjustment for varying patterns or thicknesses of stock can be made quickly and accurately, and it will be seen that the synchronizing of the work operating mechanism with the raising of the work table is made purely mechanical and requires no judgment or experience on the part of the operator.

Having thus described my invention, what I claim and desire to protect by Letters Patent is:

1. In a work treating machine, a drive means, means for clamping the work between two surfaces, an adjustable stop device for controlling the distance between said surfaces when they are in the clamping position, and means actuated by said stop device for controlling the operation of said drive means in synchronism with the clamping of the work.

2. In a work treating machine, a clutch-controlled main drive, a platen for clamping the work between it and a fixed member, means for actuating the platen, stop mechanism including fixed and movable stop members for limiting movement of the platen in respect to said fixed clamping member, and means actuated by said movable stop member for controlling the movement of said clutch.

3. In a work treating machine, a clutch-controlled main drive, a platen for clamping the work, means for actuating the platen, stop mechanism for limiting movement of the platen and including a stationary stop and a movable stop actuated by the platen actuating means, clutch control means, and means for variably regulating the timing of said clutch control means and actuated by said movable stop member.

4. In a work treating machine, a clutch-controlled drive means, actuating means for said clutch, work clamping means, actuating means for said work clamping means, and single adjustable means for limiting the stroke of said work clamping means and synchronizing the clutch actuating means in desired timed relation with the work clamping means.

5. In a blank cutting machine, cutting means including a pattern, clutch-controlled drive means therefor, clutch actuating means, a reciprocable work table movable to clamp sheet stock against said pattern, means for moving said work table to clamping position, a fixed stop, a stop member movable by said last means into contact with the fixed stop to thereby limit the clamping action of the work table, means for relatively adjusting the fixed stop and stop member, and adjustable means actuated by said stop member for controlling said clutch actuating means.

CHARLES J. STUART.